(12) United States Patent
Ito et al.

(10) Patent No.: US 11,761,782 B2
(45) Date of Patent: Sep. 19, 2023

(54) SELF-POSITION SHARING SYSTEM, VEHICLE, AND TERMINAL

(71) Applicant: Toyota Jidosha Kabushiki Kaisha, Toyota (JP)

(72) Inventors: Hironori Ito, Tokyo-to (JP); Akira Nagae, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 16/892,378

(22) Filed: Jun. 4, 2020

(65) Prior Publication Data
US 2020/0386566 A1 Dec. 10, 2020

(30) Foreign Application Priority Data

Jun. 7, 2019 (JP) ................................ 2019-107133

(51) Int. Cl.
G01C 21/36 (2006.01)
G01C 21/32 (2006.01)
(Continued)

(52) U.S. Cl.
CPC ......... *G01C 21/3655* (2013.01); *G01C 21/32* (2013.01); *G01C 21/3602* (2013.01);
(Continued)

(58) Field of Classification Search
CPC .................................................... G01C 21/28
See application file for complete search history.

(56) References Cited

U.S. PATENT DOCUMENTS 9,863,775 B2 * 1/2018 Kojo ..................... F16H 59/44
9,998,877 B2 * 6/2018 Marti ................... G01S 5/0294
(Continued)

FOREIGN PATENT DOCUMENTS

JP 2007240380 A * 9/2007
JP 2008-076389 A 4/2008
(Continued)

OTHER PUBLICATIONS

STIC machine translation of Yoshida reference, 2016 (Year: 2016).*
(Continued)

*Primary Examiner* — Redhwan K Mawari
(74) *Attorney, Agent, or Firm* — Dinsmore & Shohl LLP

(57) ABSTRACT

A terminal in a self-position sharing system that is installed in a vehicle and is capable of communicating with the vehicle includes a measurement device that measures a self-position of the terminal. Further, the vehicle in the self-position sharing system includes: a processor configured to estimate a self-position of the vehicle with measurement accuracy higher than that of the terminal at a predetermined period, determine whether or not measurement accuracy of a self-position by the terminal decreases, set a notification frequency of notifying the terminal of an estimated self-position of the vehicle to a first frequency when the measurement accuracy does not decrease, set the notification frequency to a second frequency higher than the first frequency when the measurement accuracy decreases; and notify the terminal of an estimated self-position of the vehicle with the set notification frequency.

4 Claims, 7 Drawing Sheets

(51) Int. Cl.
*G01C 21/20* (2006.01)
*G01S 19/26* (2010.01)
*G01S 19/23* (2010.01)
*G01C 21/26* (2006.01)
*G01C 21/28* (2006.01)
*G01S 19/10* (2010.01)

(52) U.S. Cl.
CPC ......... *G01C 21/3658* (2013.01); *G01C 21/20* (2013.01); *G01C 21/26* (2013.01); *G01C 21/28* (2013.01); *G01S 19/10* (2013.01); *G01S 19/23* (2013.01); *G01S 19/26* (2013.01)

(56) References Cited

U.S. PATENT DOCUMENTS

| | | | | |
|---|---|---|---|---|
| 10,313,830 | B2* | 6/2019 | Namiki | G01S 5/017 |
| 2008/0071476 | A1* | 3/2008 | Hoshizaki | G01C 21/165 |
| | | | | 701/472 |
| 2013/0211711 | A1* | 8/2013 | Kelly | G01C 21/165 |
| | | | | 701/472 |
| 2014/0244156 | A1* | 8/2014 | Magnusson | G01C 21/30 |
| | | | | 701/418 |
| 2014/0244165 | A1* | 8/2014 | Bells | G01C 21/367 |
| | | | | 701/454 |
| 2017/0010618 | A1* | 1/2017 | Shashua | G05D 1/0088 |
| 2017/0199040 | A1* | 7/2017 | Willis | G01C 21/165 |
| 2018/0066960 | A1 | 3/2018 | Tateishi et al. | |
| 2018/0073951 | A1* | 3/2018 | Venkatraman | H04W 4/023 |
| 2018/0174321 | A1* | 6/2018 | Lee | G01C 21/1656 |
| 2018/0188380 | A1* | 7/2018 | Venkatraman | G01S 19/34 |
| 2019/0113627 | A1* | 4/2019 | Koontz | G01S 19/485 |
| 2019/0346273 | A1* | 11/2019 | Ishida | G01S 19/51 |
| 2019/0376809 | A1* | 12/2019 | Hanniel | G01C 21/3602 |
| 2019/0378296 | A1* | 12/2019 | Zheng | G06T 7/73 |
| 2020/0033127 | A1* | 1/2020 | Tsujii | G06F 1/3212 |
| 2020/0072617 | A1* | 3/2020 | Tanaka | G01C 21/1652 |

FOREIGN PATENT DOCUMENTS

| | | | |
|---|---|---|---|
| JP | 2008-209346 A | | 9/2008 |
| JP | 2016205865 A | * | 12/2016 |
| JP | 2018-040693 A | | 3/2018 |
| JP | 2018105669 A | * | 7/2018 |
| WO | WO-2016130719 A2 | * | 8/2016 ............ B60W 30/10 |

OTHER PUBLICATIONS

STIC machine translation of Yamashita reference, 2018 (Year: 2018).*

* cited by examiner

NOTIFICATION
FREQUENCY: LOW

501

NOTIFICATION
FREQUENCY: HIGH

502

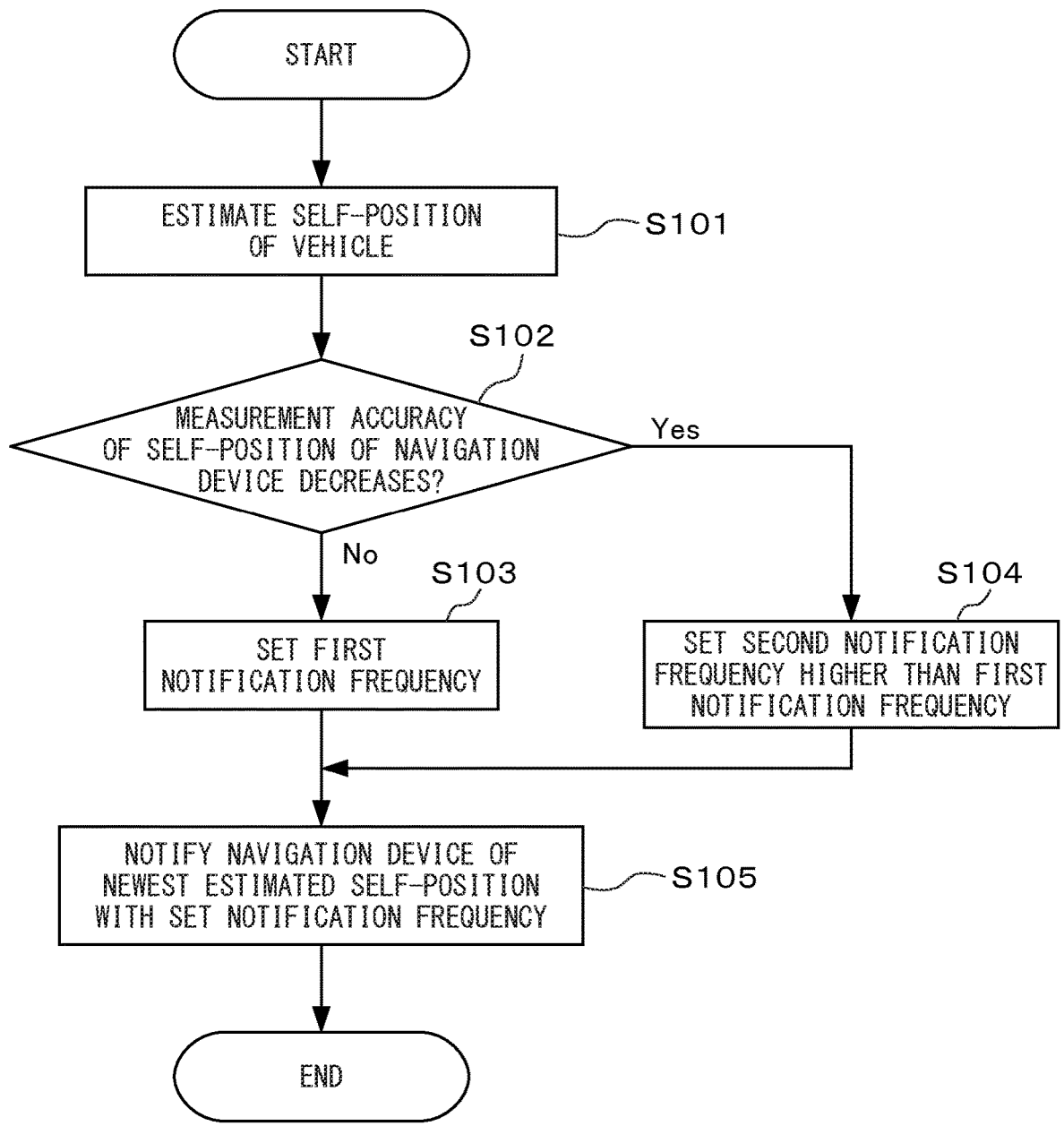

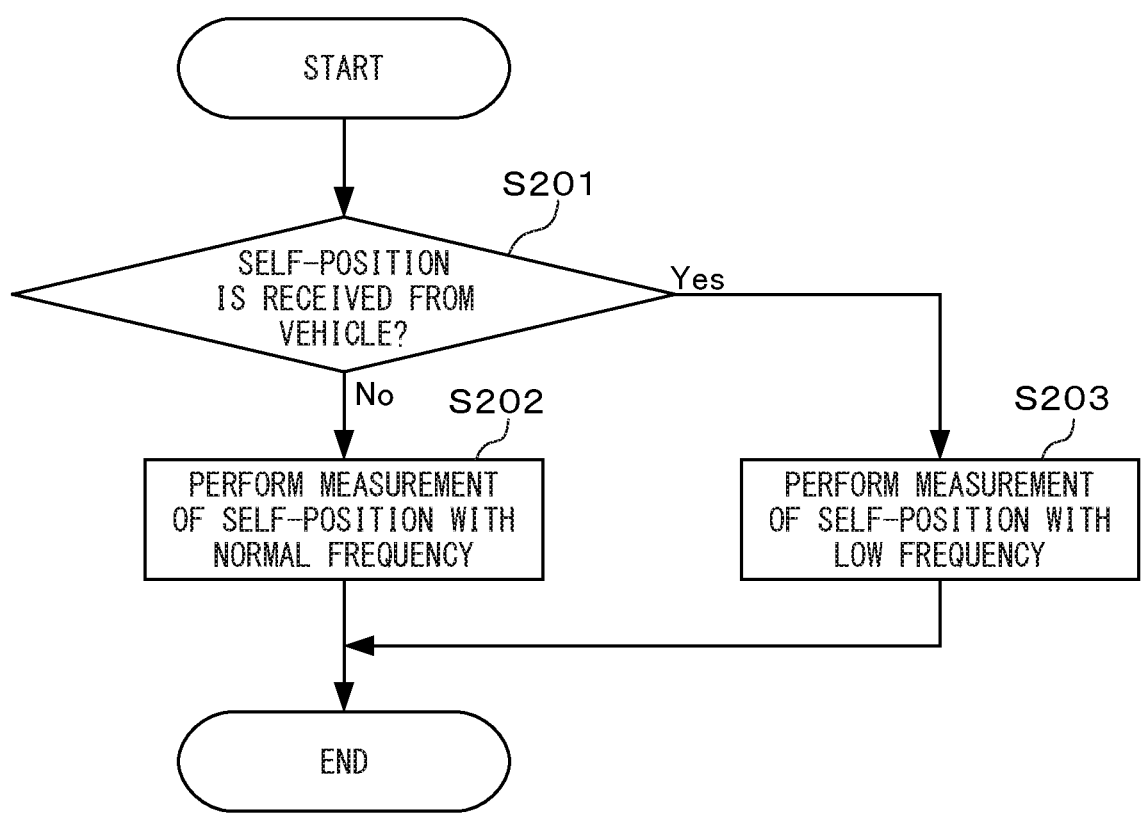

SELF-POSITION SHARING SYSTEM, VEHICLE, AND TERMINAL

CROSS-REFERENCE TO RELATED APPLICATION

This application claims priority to Japanese Patent Application No. 2019-107133 filed on Jun. 7, 2019, which is incorporated herein by reference in its entirety including the specification, drawings, and abstract.

FIELD

The present disclosure relates to a self-position sharing system capable of sharing a measurement result of a self-position between a vehicle and a terminal installed in the vehicle, and to a vehicle and a terminal included in the self-position sharing system.

BACKGROUND

In recent years, a global positioning system (GPS) receiver is installed in a portable terminal, and a position of its own device (hereinafter referred to as a self-position) can be measured. Then, a navigation application program using the measured self-position can also be used in the portable terminal.

In the portable terminal, there may be no means other than the GPS receiver as a means for measuring a self-position. Then, a self-position measured on the basis of a GPS signal received by the GPS receiver includes an error to a certain extent. Thus, a technique for correcting position information about a portable terminal in cooperation between the portable terminal and a car navigation system has been proposed (e.g., see Japanese Unexamined Patent Publication (Kokai) No. 2008-209346). In the technique, a portable terminal transmits a signal for requesting an error computation of position information to a nearby car of the portable terminal, and a car navigation system installed in the nearby car that receives the signal computes an error in position information of a GPS and transmits information about the computed error to the portable terminal. Then, the portable terminal corrects position information measured by a GPS of its own device on the basis of the received error information.

SUMMARY

However, it is not desirable to perform communication at all times between the portable terminal and the car navigation system in order to correct position information of the portable terminal while the portable terminal uses the position information of its own device because a load on each device and a communication load increase.

Thus, an object of the present disclosure is to provide a self-position sharing system capable of reducing a load on a terminal installed in a vehicle while sharing a measurement result of an accurate self-position between the vehicle and the terminal.

According to one embodiment, a self-position sharing system including a vehicle and a terminal installed in the vehicle and capable of communicating with the vehicle is provided. In the self-position sharing system, the terminal includes a measurement device that measures a self-position of the terminal. In addition, the vehicle includes: a processor configured to: estimate a self-position of the vehicle with measurement accuracy higher than that of the terminal at a predetermined period; determine whether or not measurement accuracy of a self-position by the terminal decreases; set a notification frequency of notifying the terminal of an estimated self-position of the vehicle to a first frequency when the measurement accuracy does not decrease; set the notification frequency to a second frequency higher than the first frequency when the measurement accuracy decreases; and notify the terminal of an estimated self-position of the vehicle with the notification frequency being set among the first frequency and the second frequency.

In the self-position sharing system, in some examples, the processor is further configured to determine whether or not a distance between a point at which a traveling state of the vehicle is changed and the vehicle is equal to or less than a predetermined distance, and set the notification frequency to a third frequency higher than the first frequency when the distance is equal to or less than the predetermined distance and the measurement accuracy decreases.

In addition, in the self-position sharing system, in some examples, the terminal further includes: a memory that stores map information, a display device, and a controller that displays, on the display device, an estimated self-position of the vehicle notified from the vehicle together with a lane of a road represented in the map information in which the vehicle is traveling.

According to another embodiment, a self-position sharing system including a vehicle and a terminal installed in the vehicle and capable of communicating with the vehicle is provided. In the self-position sharing system, the vehicle includes a processor configured to estimate a self-position of the vehicle at a predetermined period, and notify the terminal of an estimated self-position of the vehicle. In addition, the terminal includes a measurement device that measures a self-position of the terminal with measurement accuracy lower than that of the vehicle, and a controller that sets a frequency of measuring a self-position by the measurement device when an estimated self-position of the vehicle is notified from the vehicle to be lower than a frequency of measuring a self-position by the measurement device when an estimated self-position of the vehicle is not notified from the vehicle.

In the self-position sharing system, in some examples, the terminal further includes an electric power supply device that supplies electric power to the terminal, and the controller of the terminal sets a frequency of measuring a self-position by the measurement device only when an estimated self-position of the vehicle is notified from the vehicle and an electric power remaining quantity of the electric power supply device is equal to or less than a predetermined remaining quantity threshold value to be lower than a frequency of measuring a self-position by the measurement device when an estimated self-position of the vehicle is not notified from the vehicle.

Alternatively, in some examples, the controller of the terminal sets a frequency of measuring a self-position by the measurement device only when an estimated self-position of the vehicle is notified from the vehicle and a temperature of the terminal is equal to or higher than a predetermined temperature threshold value to be lower than a frequency of measuring a self-position by the measurement device when an estimated self-position of the vehicle is not notified from the vehicle.

Further, in the self-position sharing system, in some examples, the terminal further includes a memory that stores map information, and a display device. Furthermore, in some examples, the controller displays, on the display device, an estimated self-position of the vehicle notified from the vehicle together with a lane of a road represented in the map information in which the vehicle is traveling.

According to another embodiment, a vehicle in which a terminal capable of measuring a self-position is installed is provided. The vehicle includes: a processor configured to: estimate a self-position of the vehicle with measurement accuracy higher than that of the terminal at a predetermined period; determine whether or not measurement accuracy of a self-position by the terminal decreases; set a notification frequency of notifying the terminal of an estimated self-position of the vehicle to a first frequency when the measurement accuracy does not decrease; set the notification frequency to a second frequency higher than the first frequency when the measurement accuracy decreases; and notify the terminal of an estimated self-position of the vehicle with the notification frequency being set among the first frequency and the second frequency.

According to still another embodiment, a terminal that is installed in a vehicle capable of estimating a self-position at a predetermined period and is capable of communicating with the vehicle is provided. The terminal includes: a measurement device that measures a self-position of the terminal with measurement accuracy lower than that of the vehicle; and a controller that sets a frequency of measuring a self-position by the measurement device when an estimated self-position of the vehicle is notified from the vehicle to be lower than a frequency of measuring a self-position by the measurement device when an estimated self-position of the vehicle is not notified from the vehicle.

The self-position sharing system according to the present disclosure provides an advantageous effect capable of reducing a load on a terminal installed in a vehicle while sharing a measurement result of an accurate self-position between the vehicle and the terminal.

BRIEF DESCRIPTION OF DRAWINGS

FIG. 6 is an operation flowchart of the self-position sharing processing executed by the processor of the ECU of the vehicle.

FIG. 7 is an operation flowchart of the self-position sharing processing executed by a processor of the navigation device according to a modification example.

DESCRIPTION OF EMBODIMENTS

A self-position sharing system, and a vehicle and a terminal installed in the vehicle that are included in the self-position sharing system will be described below with reference to the drawings. The vehicle and the terminal included in the self-position sharing system can communicate with each other. Then, both of the terminal and the vehicle can measure a self-position, but the vehicle can more easily maintain high measurement accuracy of a self-position than the terminal. Thus, the self-position sharing system reduces a communication load by reducing a frequency of notifying a self-position estimated by the vehicle to the terminal when measurement accuracy of a self-position in the terminal does not decrease further than a frequency of the notification when the measurement accuracy of a self-position in the terminal decreases. Further, in the self-position sharing system, the terminal reduces a load of the terminal itself by reducing a frequency of measurement of a self-position by its own device while a self-position is notified from the vehicle to the terminal.

Figure 1:
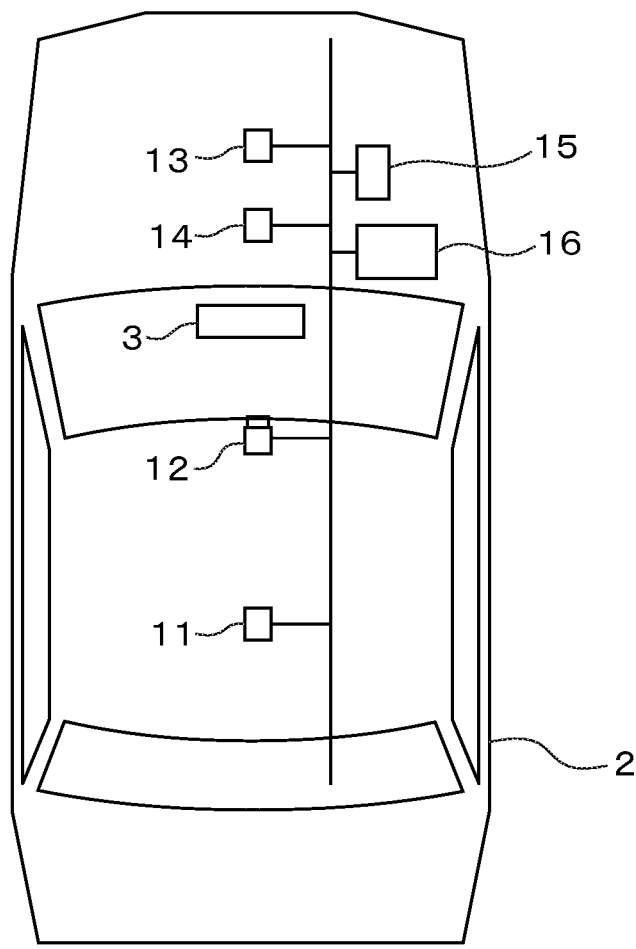
FIG. 1 is a schematic configuration diagram of a self-position sharing system.
Figure 1:
Figure 2:
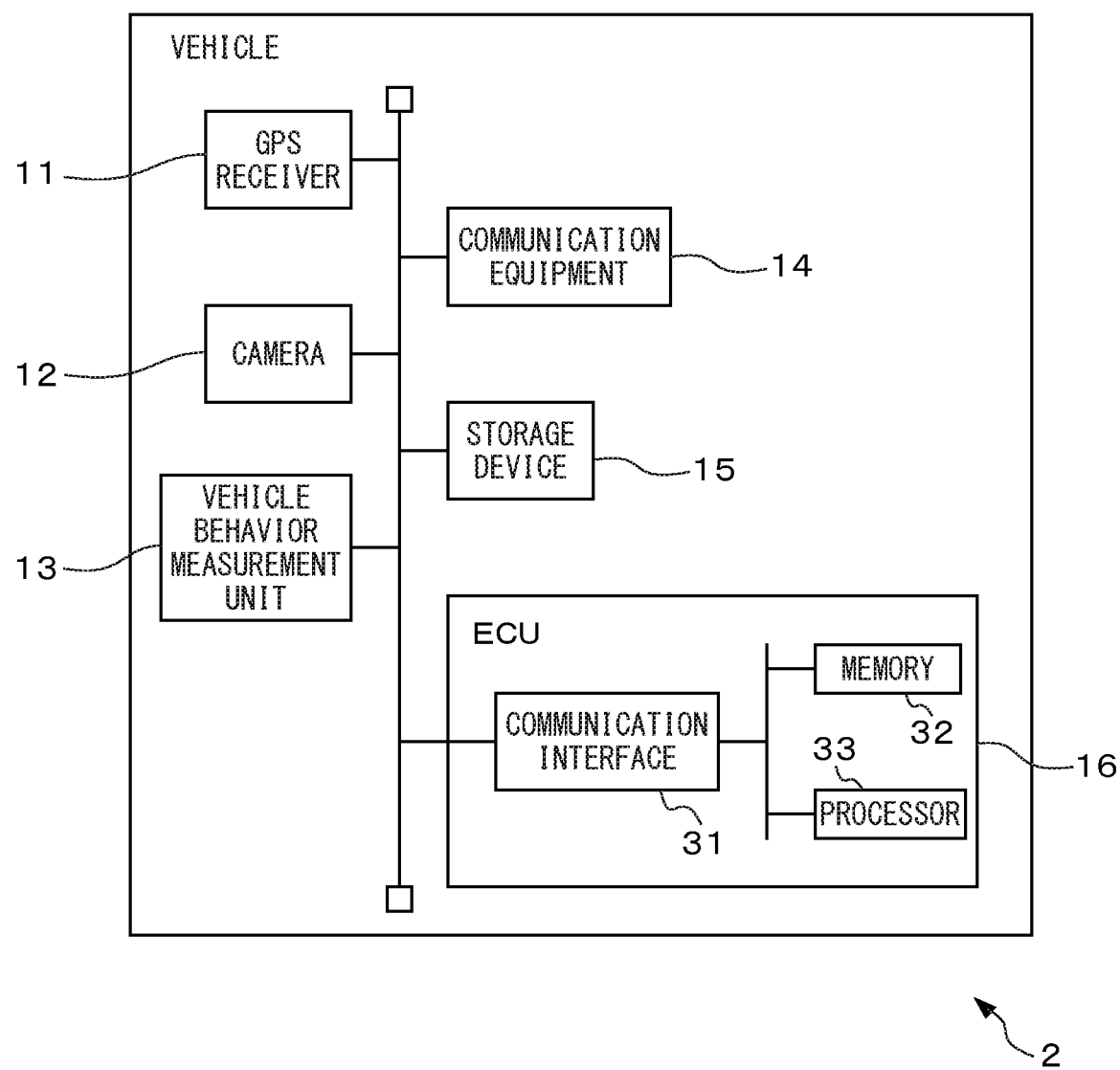
FIG. 2 is a hardware configuration diagram of a vehicle relating to self-position estimation.

FIG. 1 is a schematic configuration diagram of the self-position sharing system. FIG. 2 is a hardware configuration diagram of a vehicle 2 relating to self-position estimation. A self-position sharing system 1 includes the vehicle 2 and a navigation device 3 installed in the vehicle 2. The navigation device 3 is one example of a terminal, and is installed near an instrumental panel of the vehicle 2, for example, in such a way that a display screen of the navigation device 3 is oriented toward a user (e.g., a driver of the vehicle 2) who rides the vehicle 2. Further, the vehicle 2 (particularly, an ECU that controls the vehicle 2) and the navigation device 3 can communicate with each other.

As illustrated in FIG. 2, the vehicle 2 includes a GPS receiver 11, a camera 12, a vehicle behavior measurement unit 13, communication equipment 14, a storage device 15, and an electronic control unit (ECU) 16. The GPS receiver 11, the camera 12, the vehicle behavior measurement unit 13, the communication equipment 14, and the storage device 15 are communicably connected with the ECU 16 via an in-vehicle network conforming to a standard such as a controller area network. Note that the vehicle 2 may include a distance sensor (not illustrated) that measures a distance from the vehicle 2 to an object existing around the vehicle 2, such as LiDAR or a radar. Furthermore, the vehicle 2 may include wireless communication equipment (not illustrated) for performing wireless communication with a wireless base station in conformity to a predetermined mobile communication standard. Still further, the vehicle 2 may include a receiver conforming to another satellite positioning system instead of the GPS receiver 11.

The GPS receiver 11 receives a GPS signal from a GPS satellite at each predetermined period, and measures a self-position of the vehicle 2, based on the received GPS signal. Then, the GPS receiver 11 outputs the measurement result of the self-position of the vehicle 2 on the basis of the GPS signal, and a reception level representing intensity and quality of the received GPS signal, the number of GPS satellites whose GPS signal can be received, or the like to the ECU 16 via the in-vehicle network at each predetermined period. Note that the reception level increases as intensity and quality of the received GPS signal increase and as the number of GPS satellites whose GPS signal can be received also increases. Therefore, as the reception level increases, measurement accuracy on the basis of the GPS signal also increases. Note that, when the vehicle 2 includes a receiver conforming to a satellite positioning system other than the GPS receiver 11, the receiver may measure a self-position of the vehicle 2.

The camera 12 is one example of an imaging unit, and includes a two-dimensional detector configured with an array of photoelectric conversion elements having sensitivity to visible light such as a CCD or a C-MOS and an imaging optical system that forms an image of a region to be imaged on the two-dimensional detector. Then, the camera 12 is mounted, for example, inside the vehicle room of the vehicle 2 in such a way as to be oriented in a forward direction of the vehicle 2. Then, the camera 12 captures a forward region of the vehicle 2 at predetermined capturing periods (e.g., ¹⁄₃₀ seconds to ¹⁄₁₀ seconds), and generates an image in which the forward region is captured. The image acquired by the camera 12 may be a color image or a gray image. Note that a plurality of cameras having different capturing directions or different focal distances may be provided in the vehicle 2.

Every time the camera 12 generates an image, the camera 12 outputs the generated image to the ECU 16 via the in-vehicle network.

The vehicle behavior measurement unit 13 measures behavior of the vehicle 2 at each predetermined period. For this purpose, the vehicle behavior measurement unit 13 includes, for example, a vehicle speed sensor (not illustrated), an acceleration sensor (not illustrated), and a gyro sensor (not illustrated), and acquires a measurement signal representing behavior of the vehicle 2 such as a speed, acceleration, and a yaw rate of the vehicle 2 by the sensors. Then, the vehicle behavior measurement unit 13 generates vehicle behavior information representing behavior of the vehicle 2, based on the measurement signal, at each predetermined period, and notifies the ECU 16 of the vehicle behavior information via the in-vehicle network.

The communication equipment 14 communicates with the navigation device 3. For this purpose, the communication equipment 14 includes, for example, an antenna for transmitting or receiving a wireless signal conforming to a predetermined short-range wireless communication standard, and a communication circuit for transmitting or receiving the wireless signal. The predetermined short-range wireless communication standard can be, for example, Bluetooth (registered trademark). Note that, when the communication equipment 14 and the navigation device 3 are connected to each other in a wired manner, the communication equipment 14 may include a communication interface and a communication circuit conforming to a bus standard such as a universal serial bus (USB). Then, when the communication equipment 14 receives, from the ECU 16, positioning information representing an estimated self-position of the vehicle 2 and a time at which the measurement is performed, the communication equipment 14 transmits the received positioning information to the navigation device 3. Further, the communication equipment 14 passes the information received from the navigation device 3, such as route information representing a destination of the vehicle 2 and a traveling route to the destination, to the ECU 16.

The storage device 15 includes, for example, a hard disk device, a non-volatile semiconductor memory, or an optical recording medium and an access device thereof. Then, the storage device 15 stores map information. The map information includes, for each predetermined section of a road, a position in the section, information representing a road marking such as a lane division line or a stop line in the section, and information representing a road sign in the section. Furthermore, the map information may include information representing a region in which measurement accuracy of a self-position on the basis of a GPS signal decreases further than that under normal circumstances (hereinafter referred to as an accuracy decreasing region). Then, the storage device 15 reads the map information in response to a request for reading the map information from the ECU 16, and passes the map information to the ECU 16 via the in-vehicle network.

The ECU 16 performs automatic driving control of the vehicle 2, based on the image acquired from the camera 12, the map information read from the storage device 15, and the traveling route notified from the navigation device 3, or controls the vehicle 2 for a driving support such as a collision avoidance support, auto-cruising, or a lane keeping assist when a user drives the vehicle 2. Further, in the present embodiment, the ECU 16 estimates a self-position of the vehicle 2, based on the measurement result of the self-position of the vehicle 2 acquired by the GPS receiver 11, the image acquired by the camera 12, the behavior information received from the vehicle behavior measurement unit 13, and the map information read from the storage device 15, more accurately than a measurement of a self-position on the basis of a GPS signal. Then, the ECU 16 generates positioning information representing an estimated self-position of the vehicle 2 and a time at which the measurement is performed, and transmits the generated positioning information to the navigation device 3 via the communication equipment 14.

Note that details of the processing by the ECU 16 will be described later.

Figure 3:
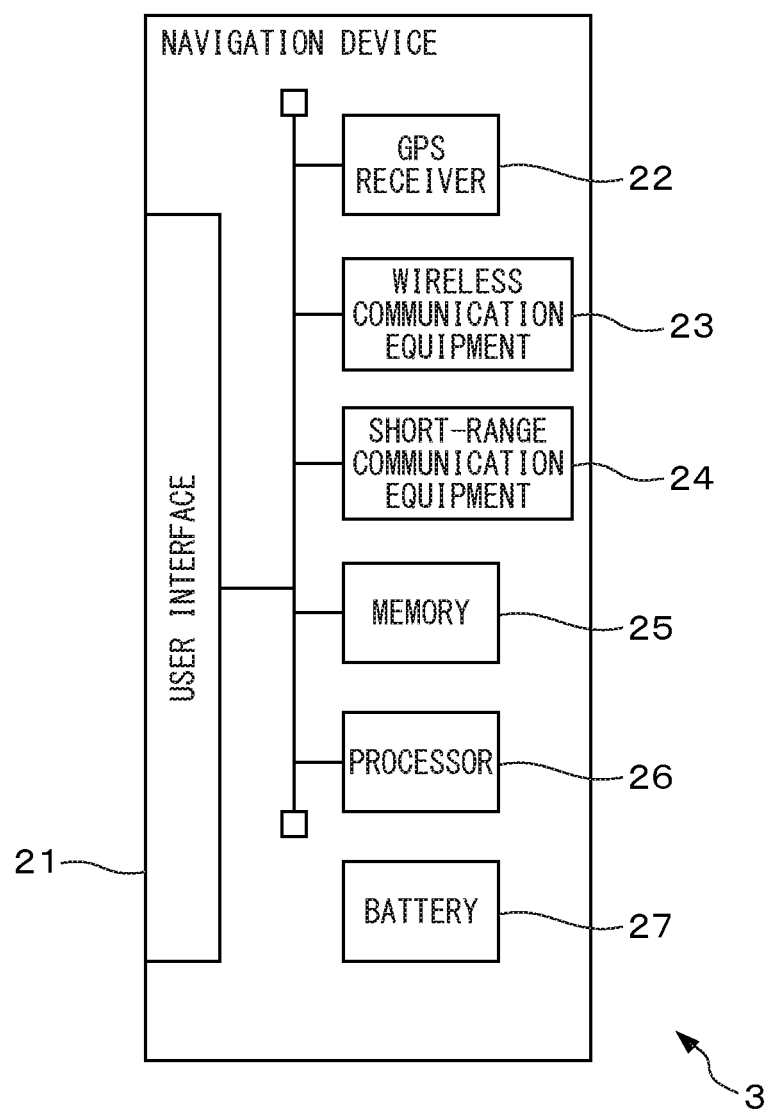
FIG. 3 is a hardware configuration diagram of a navigation device.

FIG. 3 is a hardware configuration diagram of the navigation device 3. The navigation device 3 is, for example, a portable terminal such as a portable telephone, and includes a user interface 21, a GPS receiver 22, wireless communication equipment 23, short-range communication equipment 24, a memory 25, a processor 26, and a battery 27. The user interface 21, the GPS receiver 22, the wireless communication equipment 23, the short-range communication equipment 24, the memory 25, and the processor 26 are communicably connected to one another via a signal line such as a bus. The navigation device 3 may further include an acceleration sensor or a gyro sensor. Furthermore, the navigation device 3 may include a battery remaining quantity meter (not illustrated) that measures a remaining quantity of the battery 27. Still further, the navigation device 3 may include a receiver conforming to another satellite positioning system instead of the GPS receiver 22. Note that the navigation device 3 may be a navigation dedicated apparatus fixedly installed inside the vehicle room of the vehicle 2.

The user interface 21 is one example of a display unit, and includes, for example, a touch panel display. Then, the user interface 21 generates an operation signal in response to an operation by a user such as activation of the navigation device 3, input of a destination of the vehicle 2, and a route search to a destination, and passes the operation signal to the processor 26. Further, the user interface 21 displays display information that is received from the processor 26 and represents a relative positional relationship between a road around the vehicle 2 and the vehicle 2, and the like. For example, the user interface 21 displays an estimated self-position of a vehicle together with a lane of a road represented in map information in which the vehicle is traveling.

The GPS receiver 22 is one example of a measurement unit, and receives a GPS signal from a GPS satellite at each predetermined period, and measures a self-position of the navigation device 3 on the basis of the received GPS signal. Then, the GPS receiver 22 outputs the measurement result of the self-position of the navigation device 3 on the basis of the GPS signal and a reception level to the processor 26 at each predetermined period. Note that, when the navigation device 3 includes a receiver conforming to a satellite positioning system other than the GPS receiver 22, the receiver may measure a self-position of the navigation device 3.

The wireless communication equipment 23 performs wireless communication with the wireless base station in conformity to a predetermined mobile communication standard. For this purpose, the wireless communication equipment 23 includes an antenna for transmitting an uplink signal to be transmitted to the wireless base station or receiving a downlink signal from the wireless base station, and a communication circuit for executing wireless connection processing with the wireless base station, transmission processing of an uplink signal, and reception processing of a downlink signal. Then, the wireless communication equipment 23 generates an uplink signal that includes information received from the processor 26 and to be transmitted to another apparatus, and transmits the generated uplink signal to the wireless base station via the antenna. Further, the wireless communication equipment 23 extracts information from another apparatus (e.g., map information from a map management server or a traveling route from a route search server) being included in a downlink signal received via the antenna, and passes the extracted information to the processor 26.

The short-range communication equipment 24 communicates with the communication equipment 14 of the vehicle 2. For this purpose, the short-range communication equipment 24 includes, for example, an antenna for transmitting or receiving a wireless signal conforming to a predetermined short-range wireless communication standard, and a communication circuit for transmitting or receiving the wireless signal. The predetermined short-range wireless communication standard can be, for example, Bluetooth (registered trademark). Note that, when the communication equipment 14 of the vehicle 2 and the navigation device 3 are connected to each other in a wired manner, the short-range communication equipment 24 may include a communication interface conforming to a bus standard such as a universal serial bus (USB) and a communication circuit. Then, when the short-range communication equipment 24 receives the positioning information from the communication equipment 14 of the vehicle 2, the short-range communication equipment 24 passes the received positioning information to the processor 26. Further, the short-range communication equipment 24 passes the information received from the processor 26, such as route information representing a destination of the vehicle 2 and a traveling route to the destination, to the communication equipment 14 of the vehicle 2.

The memory 25 is one example of a storage unit. The memory 25 includes, for example, a non-volatile semiconductor memory and a volatile semiconductor memory, and stores information used in various kinds of application programs executed on the processor 26. For example, the memory 25 stores navigation map information being used in a navigation application program. Further, the memory 25 stores, in a certain period, the positioning information received from the vehicle 2.

The processor 26 is one example of a control unit, and includes, for example, one or a plurality of central processing units (CPUs) and peripheral circuits thereof. The processor 26 may further include another arithmetic circuit such as a logical arithmetic unit, a numerical arithmetic unit, or a graphic processing unit. Then, the processor 26 controls each unit of the navigation device 3. Further, the processor 26 executes navigation processing on the vehicle 2 in accordance with a navigation program operating on its own device. At this time, the processor 26 uses a measured self-position of the vehicle 2 or a measured self-position of the navigation device 3. Furthermore, the processor 26 executes processing of a part of self-position sharing processing that the navigation device 3 is in charge of.

For this purpose, the processor 26 receives the positioning information from the vehicle 2 via the short-range communication equipment 24 with a predetermined notification frequency while at least the navigation program is operating. Note that details of the predetermined notification frequency will be described later, and, for example, a notification frequency when measurement accuracy of a self-position in the navigation device 3 decreases is set higher than a notification frequency when the measurement accuracy of a self-position in the navigation device 3 does not decrease. Note that when data representing a measurement result of a self-position is included in a predetermined signal region in a predetermined format of a signal received from the vehicle 2 via the short-range communication equipment 24 in the latest predetermined period (e.g., 100 milliseconds to 1 second), the processor 26 can determine that the positioning information can be received from the vehicle 2. Further, when data indicating that a measurement of a self-position fails is included in the predetermined signal region in the predetermined format of the signal received from the vehicle 2 via the short-range communication equipment 24 in the latest predetermined period, the processor 26 can determine that the positioning information cannot be received from the vehicle 2.

When activation of the navigation program is instructed and a destination of the vehicle 2 is input by an operation of a user via the user interface 21, the processor 26 determines a traveling route of the vehicle 2 from a current position of the vehicle 2 to the destination in accordance with a predetermined route search method such as a Dijkstra method. Note that the processor 26 can use, as the current position of the vehicle 2, a self-position by the newest measurement result of the navigation device 3 received from the GPS receiver 22 or a self-position of the vehicle 2 represented in the newest positioning information received from the vehicle 2 via the short-range communication equipment 24, for example. Alternatively, the processor 26 may cause a route search server (not illustrated) to search a traveling route. In this case, the processor 26 may notify the route search server connected to the wireless base station via a network of a current position and a destination of the vehicle 2 together with identification information about the vehicle 2 or identification information about the navigation device 3 via the wireless communication equipment 23 and the wireless base station. Then, the processor 26 may receive information representing the traveling route from the route search server via the wireless base station and the wireless communication equipment 23. Then, the processor 26 notifies a user of the received traveling route via the user interface 21, and also notifies the vehicle 2 of the received traveling route via the short-range communication equipment 24.

Furthermore, when a traveling situation of the vehicle 2 becomes a predetermined traveling situation during execution of the navigation program, the processor 26 notifies, via the user interface 21, a user of a self-position of the navigation device 3 measured by the GPS receiver 22 or a self-position of the vehicle 2 represented in the positioning information received from the vehicle 2 via the short-range communication equipment 24. Particularly, when the processor 26 receives the positioning information received from the vehicle 2 within the latest predetermined period, the processor 26 notifies, via the user interface 21, a user of a self-position of the vehicle 2 represented in the newest positioning information. In this way, the processor 26 can notify a user of a more accurate self-position of the vehicle 2 than a self-position acquired as a result of a measurement by the navigation device 3 itself. Note that the processor 26 may correct a self-position of the vehicle 2 to be notified to a user by adding, to the most recently acquired self-position of the vehicle 2, a positional change amount (i.e., a positional change amount of the vehicle 2 in which the navigation device 3 is installed) of the navigation device 3 from a measurement time of the most recently acquired self-position to the present time. The positional change amount is acquired by, for example, executing integration twice on each of acceleration acquired by the acceleration sensor of the navigation device 3 and angular acceleration acquired by the gyro sensor from a measurement time of the self-position to the present time.

The predetermined traveling situation includes, for example, a situation where a distance from the vehicle 2 to an intersection at which the vehicle 2 plans to make a right turn or a left turn is equal to or less than a predetermined distance, a situation where a lane in which the vehicle 2 is traveling merges with another lane, a situation where a distance from the vehicle 2 to an expressway or a tollgate at an entrance of an expressway is equal to or less than a predetermined distance, a situation where the vehicle 2 changes a lane or passes when automatic driving control is performed, or the like. Further, the processor 26 causes a display screen of the user interface 21 to display a self-position of the vehicle 2 together with a lane of a road represented in the map information in which the vehicle 2 is traveling. For example, the processor 26 causes the display screen of the user interface 21 to display information indicating a self-position of the vehicle 2 on a road (e.g., a lane in which the vehicle 2 is traveling or a distance from the vehicle 2 to a specific place such as an intersection or a tollgate) together with an image representing a road situation around the self-position of the vehicle 2 (e.g., an image representing an individual lane in a traveling direction of the vehicle 2). Particularly, the processor 26 can reduce an error between a self-position of the vehicle 2 displayed in accordance with the navigation program and an actual position of the vehicle 2 by using an accurate self-position of the vehicle 2 represented in the positioning information received from the vehicle 2 for a notification to a user. Thus, the processor 26 prevents a user who sees a position of the vehicle 2 displayed on the display screen of the user interface 21 of the navigation device 3 from feeling strange.

The battery 27 is one example of an electric power supply unit, and supplies electric power to each unit of the navigation device 3. For this purpose, the battery 27 includes a lithium-ion secondary battery or a secondary battery in another form.

Details of the self-position sharing processing by the ECU 16 of the vehicle 2 will be described below.

With reference to FIG. 2 again, the ECU 16 includes a communication interface 31, a memory 32, and a processor 33.

The communication interface 31 includes an interface circuit for connecting the ECU 16 to the in-vehicle network. Then, every time the communication interface 31 receives a measurement result of a self-position and a reception level from the GPS receiver 11, the communication interface 31 passes the received measurement result and the received reception level to the processor 33. Further, every time the communication interface 31 receives an image from the camera 12, the communication interface 31 passes the received image to the processor 33. Furthermore, every time the communication interface 31 receives behavior information from the vehicle behavior measurement unit 13, the communication interface 31 passes the received behavior information to the processor 33. Still further, when the communication interface 31 receives route information from the communication equipment 14, the communication interface 31 passes the received route information to the processor 33. On the other hand, when the communication interface 31 receives positioning information from the processor 33, the communication interface 31 outputs the received positioning information to the communication equipment 14. Still further, the communication interface 31 passes the map information read from the storage device 15 to the processor 33.

The memory 32 includes, for example, a volatile semiconductor memory and a non-volatile semiconductor memory. Then, the memory 32 stores various kinds of data used in the self-position sharing processing and vehicle control processing executed by the processor 33 of the ECU 16. For example, the memory 32 stores an image received from the camera 12, a measurement result of a self-position, various kinds of parameters for identifying a classifier for detecting structure on a road, an internal parameter of the camera 12, and the like. Furthermore, the memory 32 may temporarily store the map information. Still further, the memory 32 temporarily stores various kinds of data generated during the self-position sharing processing and the vehicle control processing.

The processor 33 includes one or a plurality of central processing units (CPUs) and peripheral circuits thereof. The processor 33 may further include another arithmetic circuit such as a logical arithmetic unit, a numerical arithmetic unit, or a graphic processing unit. Then, the processor 33 executes the self-position sharing processing while the vehicle 2 is traveling along a traveling route received from the navigation device 3. Furthermore, the processor 33 may control the vehicle 2 in such a way as to automatically drive the vehicle 2, based on an object around the vehicle 2 detected from a received image.

Figure 4:
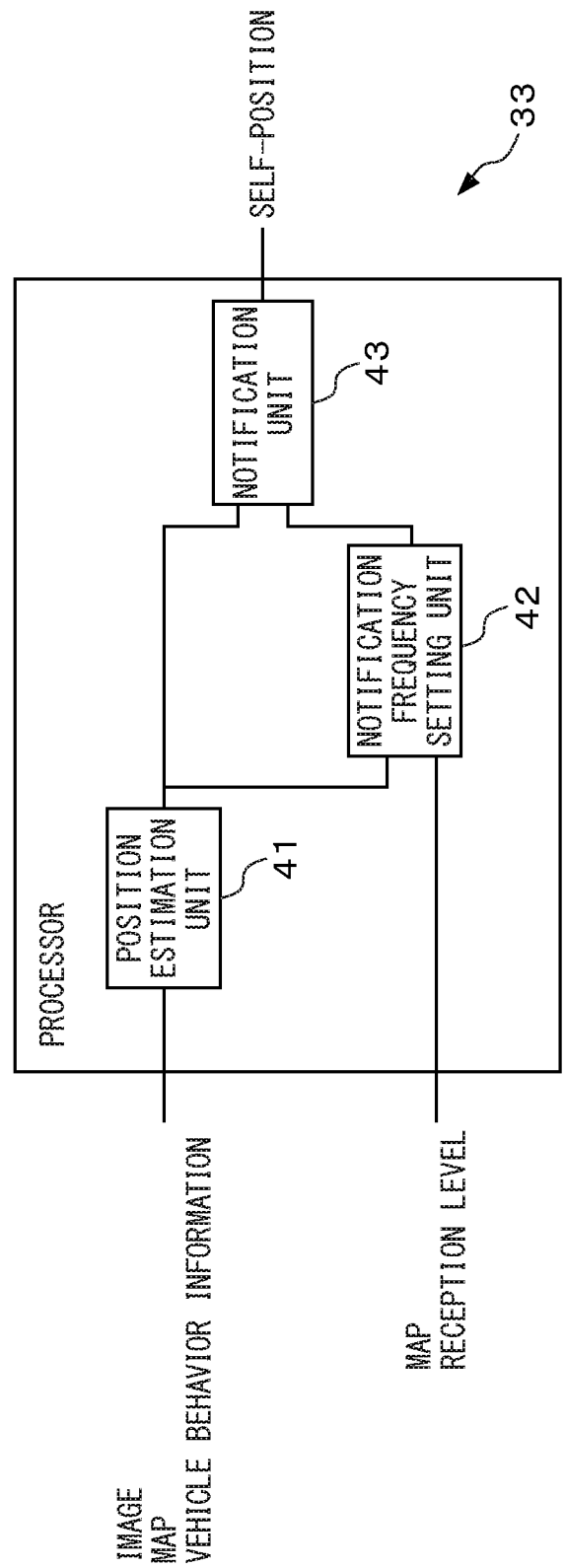
FIG. 4 is a functional block diagram of a processor of an ECU of a vehicle relating to self-position sharing processing.

FIG. 4 is a functional block diagram of the processor 33 of the ECU 16 relating to the self-position sharing processing. The processor 33 includes a position estimation unit 41, a notification frequency setting unit 42, and a notification unit 43. Each of these units included in the processor 33 is, for example, a function module achieved by a computer program operating on the processor 33. Alternatively, each of these units included in the processor 33 may be a dedicated arithmetic circuit provided in the processor 33.

The position estimation unit 41 estimates a self-position of the vehicle 2 at each predetermined period. For example, the position estimation unit 41 assumes a position and a posture of the vehicle 2, and projects a structure on a road (e.g., a road marking such as a lane division line or a stop line) detected from an image acquired from the camera 12 onto a map, or projects a structure on a road around the vehicle 2 on a map represented in the map information onto an image. Then, the position estimation unit 41 estimates, as a self-position of the vehicle 2, a position and a posture of the vehicle 2 when the structure on the road detected from the image coincides the most with the structure on the road represented on the map. In this way, the position estimation unit 41 can estimate a self-position of the vehicle 2 more accurately than a self-position of the vehicle 2 measured on the basis of a GPS signal.

Specifically, the position estimation unit 41 detects a structure on a road from the newest image acquired from the camera 12. For this purpose, the position estimation unit 41 detects the structure on the road represented on the image by inputting the image to a classifier which has been trained in advance in such a way as to detect a structure on a road from an image. At this time, the position estimation unit 41 can use, as the classifier used for detecting a structure on a road, a deep neural network (DNN) having a convolutional neural network (CNN) type architecture, such as a Single Shot Multibox Detector (SSD) or a Faster R-CNN, for example.

Next, the position estimation unit 41 assumes a position and a posture of the vehicle 2, and projects the structure on the road detected from the image onto the map, or projects the structure on the road around the vehicle 2 on the map represented in the map information onto the image. At this time, the position estimation unit 41 can set the newest position and posture of the vehicle 2 by the GPS receiver 11 as an initial value of assumed position and posture of the vehicle 2. Alternatively, the position estimation unit 41 may set a previously estimated position and posture of the vehicle 2 as an initial value of assumed position and posture of the vehicle 2. Alternatively, the position estimation unit 41 may set, as an initial value of assumed position and posture of the vehicle 2, a position and a posture calculated by correcting a previously estimated position and posture of the vehicle 2 by a positional change amount of the vehicle 2 estimated from vehicle behavior information acquired since the previous estimation time until the present time.

The position estimation unit 41 projects the structure on the road detected from the image onto the map by using the initial value of the assumed position and posture of the vehicle 2 and the internal parameter of the camera 12 such as a focal distance of the camera 12, a height from a road surface to the camera 12, and a capturing direction of the camera 12, or projects the structure on the road around the vehicle 2 on the map represented in the map information onto the image. Then, the position estimation unit 41 calculates a matching score (e.g., a normalized cross-correlation value) between the structure on the road detected from the image and the structure on the road represented on the map.

The position estimation unit 41 repeats the above-described processing while changing assumed position and posture of the vehicle 2. Then, the position estimation unit 41 estimates, as an actual self-position of the vehicle 2, assumed position and posture when the matching score is maximum.

Note that the position estimation unit 41 may estimate a self-position of the vehicle 2 in accordance with another method capable of measuring a self-position of the vehicle 2 more accurately than a measurement of a self-position on the basis of a GPS signal. For example, the position estimation unit 41 may estimate a self-position of the vehicle 2 on the basis of a distance and a bearing from the vehicle 2 to a surrounding object (e.g., a road marking) measured by a distance sensor installed in the vehicle 2 and a position of the object represented on a map.

The position estimation unit 41 stores an estimated self-position of the vehicle 2 and a time at which the self-position is measured (e.g., a time at which the camera 12 generates an image used for measuring the self-position) in the memory 32. Further, when the position estimation unit 41 cannot detect a structure on a road from each image acquired during the latest predetermined period, or when the position estimation unit 41 cannot estimate a self-position more accurately than the GPS receiver 11 as in a case where there is no highly accurate map information including information about a feature usable for measuring a self-position, such as a lane division line, for a section in which the vehicle 2 is located, the position estimation unit 41 may store a flag representing that estimation of the self-position fails in the memory 32.

The notification frequency setting unit 42 sets a frequency of notifying the navigation device 3 of a self-position of the vehicle 2 estimated by the position estimation unit 41 (hereinafter referred to as a notification frequency).

In the present embodiment, the notification frequency setting unit 42 determines whether or not measurement accuracy of a self-position in the navigation device 3 decreases. Then, the notification frequency setting unit 42 sets a notification frequency when the measurement accuracy of a self-position in the navigation device 3 decreases higher than that when the measurement accuracy of a self-position in the navigation device 3 does not decrease.

The notification frequency setting unit 42 refers to an accuracy decreasing region in the map information read from the storage device 15, for example. Then, the notification frequency setting unit 42 determines whether or not a self-position of the vehicle 2 estimated by the position estimation unit 41 is included in the accuracy decreasing region, and determines that the measurement accuracy of a self-position in the navigation device 3 decreases when the self-position of the vehicle 2 is included in the accuracy decreasing region. Note that, for example, information relating to a point where the measurement accuracy of a self-position actually decreased due to lowering of reception level of a GPS signal and the like or a point where a reception level of a GPS signal decreases due to a geographical condition, such as inside a tunnel, a mountainous area, or under a viaduct, are collected, and the accuracy decreasing region is set in advance in such a way as to include the points.

Further, when a reception level of a GPS signal in the GPS receiver 11 decreases to be equal to or lower than a predetermined level, it is estimated that a reception level of the navigation device 3 installed in the vehicle 2 also decreases similarly. Thus, when a reception level of a GPS signal notified from the GPS receiver 11 decreases to be equal to or lower than a predetermined level, the notification frequency setting unit 42 may determine that the measurement accuracy of a self-position in the navigation device 3 decreases.

When the measurement accuracy of a self-position in the navigation device 3 does not decrease, the notification frequency setting unit 42 sets a notification frequency to a first notification frequency (e.g., every 100 milliseconds to 1 second), for example. On the other hand, when the measurement accuracy of a self-position in the navigation device 3 decreases, the notification frequency setting unit 42 sets a notification frequency to a second notification frequency (e.g., every 30 milliseconds to 50 milliseconds) higher than the first notification frequency, for example. Then, the notification frequency setting unit 42 notifies the notification unit 43 of the set notification frequency.

Figure 5:
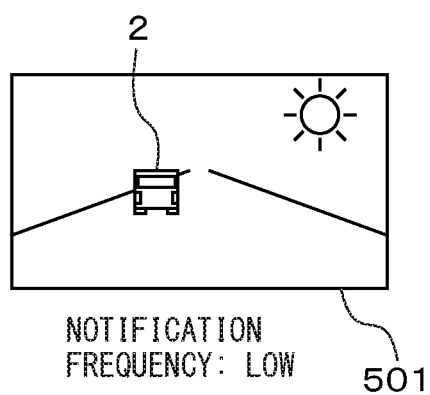
FIG. 5 is a diagram explaining an outline of notification frequency setting according to the present embodiment.
Figure 5:
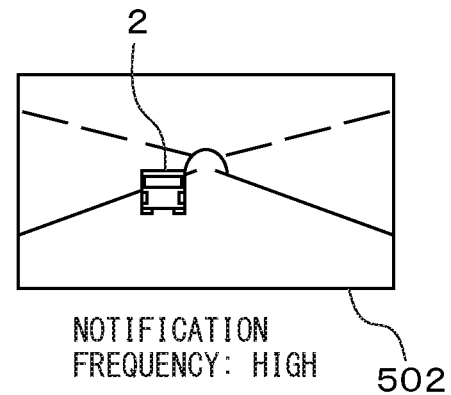

FIG. 5 is a diagram explaining an outline of notification frequency setting according to the present embodiment. As illustrated in FIG. 5, in situation 501 where there is nothing blocking reception of a GPS signal around the vehicle 2 and the measurement accuracy of a self-position by the navigation device 3 does not decrease, a relatively low notification frequency (the above-described first notification frequency) is set. On the other hand, in situation 502 where the measurement accuracy of a self-position by the navigation device 3 decreases due to traveling of the vehicle 2 inside a tunnel and the like, a relatively high notification frequency (the above-described second notification frequency) is set.

The notification unit 43 transmits a self-position of the vehicle 2 estimated by the position estimation unit 41 to the navigation device 3 with the set notification frequency. In other words, the notification unit 43 reads the newest self-position of the vehicle 2 and a time at which the self-position is measured from the memory 32 at timing at which the notification unit 43 transmits the self-position of the vehicle 2 with the set notification frequency, and generates positioning information representing the self-position and the time at which the self-position is measured. Note that, when the position estimation unit 41 fails to estimate the self-position over the latest predetermined period, the notification unit 43 may include the information indicating the matter in the positioning information. Then, the notification unit 43 transmits the generated positioning information to the navigation device 3 via the communication interface 31 and the communication equipment 14.

FIG. 6 is an operation flowchart of the self-position sharing processing executed by the processor 33. The processor 33 may execute the self-position sharing processing in accordance with the following operation flowchart at each predetermined period.

The position estimation unit 41 of the processor 33 estimates a self-position of the vehicle 2 (step S101). Further, the notification frequency setting unit 42 of the processor 33 determines whether or not measurement accuracy of a self-position in the navigation device 3 decreases (step S102). When the measurement accuracy of a self-position in the navigation device 3 does not decrease (step S102—No), the notification frequency setting unit 42 sets a notification frequency to the first notification frequency (step S103). On the other hand, when the measurement accuracy of a self-position in the navigation device 3 decreases (step S102—Yes), the notification frequency setting unit 42 sets the notification frequency to the second notification frequency higher than the first notification frequency (step S104).

After step S103 or S104, the notification unit 43 of the processor 33 transmits a self-position of the vehicle 2 estimated by the position estimation unit 41 to the navigation device 3 with the set notification frequency (step S105). Then, the processor 33 ends the self-position sharing processing.

As described above, the self-position sharing system includes a vehicle having relatively high measurement accuracy of a self-position and a terminal that is installed in the vehicle and has relatively low measurement accuracy of a self-position. Then, the self-position sharing system sets a notification frequency of a self-position from the vehicle to the terminal when the measurement accuracy of a self-position in the terminal decreases higher than a notification frequency of a self-position from the vehicle to the terminal when the measurement accuracy does not decrease. In this way, the self-position sharing system can reduce the notification frequency when the measurement accuracy of a self-position in the terminal does not decrease, and can thus reduce a communication load between the vehicle and the terminal while sharing a measurement result of an accurate self-position between the vehicle and the terminal.

According to a modification example, the processor 26 of the navigation device 3 may suppress an execution frequency of a measurement of a self-position by the navigation device 3 itself while the processor 26 can receive the positioning information from the vehicle 2. For example, the processor 26 may turn off the GPS receiver 22 while the processor 26 can receive the positioning information from the vehicle 2. Alternatively, the processor 26 may turn off processing of correcting a self-position on the basis of acceleration measured by the acceleration sensor included in the navigation device 3 or angular acceleration measured by the gyro sensor on a self-position of the navigation device 3 measured by the GPS receiver 22 while the processor 26 can receive the positioning information from the vehicle 2. Alternatively, the processor 26 may set a measurement period by the GPS receiver 22 during reception of the positioning information from the vehicle 2 to be longer than a measurement period by the GPS receiver 22 during non-reception of the positioning information from the vehicle 2. In this way, the navigation device 3 can reduce an arithmetic load by a measurement of a self-position, and can also reduce electric power consumption of the navigation device 3.

Note that, as described above, when the data representing a measurement result of a self-position is included in the predetermined signal region in the predetermined format of the signal received from the vehicle 2 via the short-range communication equipment 24 in the latest predetermined period, the processor 26 can determine that the positioning information can be received from the vehicle 2. Further, when the data indicating that a measurement of a self-position fails is included in the predetermined signal region in the predetermined format of the signal received from the vehicle 2 via the short-range communication equipment 24 in the latest predetermined period, the processor 26 can determine that the positioning information cannot be received from the vehicle 2.

FIG. 7 is an operation flowchart of the self-position sharing processing executed by the processor 26 of the navigation device 3 according to the modification example. The processor 26 may execute the self-position sharing processing according to the following operation flowchart at each predetermined period.

The processor 26 determines whether or not a measurement result of a self-position is received from the vehicle 2 (step S201). When the measurement result of the self-position is not received from the vehicle 2 (step S201—No), the processor 26 performs a measurement of a self-position by the navigation device 3 itself with a normal execution frequency (step S202). On the other hand, when the measurement result of the self-position is received from the vehicle 2 (step S201—Yes), the processor 26 performs a measurement of a self-position by the navigation device 3 itself with an execution frequency lower than the normal execution frequency (step S203). After step S202 or S203, the processor 26 ends the self-position sharing processing.

Note that, in the modification example, the vehicle 2 may notify the navigation device 3 of a measurement result of a self-position of the vehicle 2 with a constant notification frequency regardless of measurement accuracy of a self-position in the navigation device 3.

According to another modification example, the processor 26 of the navigation device 3 may suppress a frequency of a measurement of a self-position by the navigation device 3 itself while a remaining quantity of the battery 27 (electric power remaining quantity) is equal to or less than a predetermined remaining quantity value and the processor 26 can also receive a measurement result of a self-position from the vehicle 2. In addition, the navigation device 3 may include a thermometer (not illustrated). Alternatively, the vehicle 2 may include a thermometer (not illustrated) installed around the navigation device 3, and the ECU 16 may notify the navigation device 3 of a temperature measured by the thermometer as a temperature of the navigation device 3 via the communication equipment 14. In this case, the processor 26 may suppress a frequency of a measurement of a self-position by the navigation device 3 itself while the temperature of the navigation device 3 measured by the thermometer is equal to or higher than a predetermined upper limit temperature and the processor 26 can also receive a measurement result of a self-position from the vehicle 2. Note that the processor 26 may measure a remaining quantity of the battery 27 by a battery remaining quantity meter. Further, similarly to the above-described embodiment, the processor 26 may suppress a frequency of a measurement of a self-position by turning off the GPS receiver 22, turning off the processing of correcting a self-position, or increasing a measurement period by the GPS receiver 22. In this way, the navigation device 3 can suppress electric power consumption by a measurement of a self-position, and can thus suppress a situation where the navigation processing cannot continue due to an insufficient remaining quantity of the battery 27 before the vehicle 2 reaches a destination. Further, the navigation device 3 can prevent occurrence of a failure due to an excessive rise in temperature of its own device.

Note that, in the modification example, the vehicle 2 may also notify the navigation device 3 of a measurement result of a self-position of the vehicle 2 with a constant notification frequency regardless of measurement accuracy of a self-position in the navigation device 3.

According to another modification example, in the processor 33 of the ECU 16 of the vehicle 2, the notification frequency setting unit 42 may determine whether or not a situation is a traveling situation where an accurate self-position of the vehicle 2 is required to be notified to a user (hereinafter referred to as a precise notification situation), and set a notification frequency when the traveling situation of the vehicle 2 is the precise notification situation higher than a notification frequency when the traveling situation of the vehicle 2 is not the precise notification situation. For example, the notification frequency setting unit 42 may set a notification frequency when the traveling situation of the vehicle 2 is the precise notification situation to be equal to the above-described second notification frequency or to a third notification frequency higher than the second notification frequency. On the other hand, the notification frequency setting unit 42 may set a notification frequency when the traveling situation of the vehicle 2 is not the precise notification situation to the above-described first notification frequency. Note that the precise notification situation includes, for example, a situation where the vehicle 2 makes a right turn or a left turn, or a situation where an event of changing a traveling state of the vehicle 2 occurs, such as when the vehicle 2 merges with an adjacent lane from a lane in which the vehicle 2 is traveling. Thus, the notification frequency setting unit 42 may determine that a current traveling situation is the precise notification situation of the vehicle 2 when a distance from a current self-position of the vehicle 2 to a point at which such an event occurs (e.g., an intersection where the vehicle 2 makes a right turn or a left turn or a point of merging) is equal to or less than a predetermined distance. Note that the notification frequency setting unit 42 may set a notification frequency when the traveling situation of the vehicle 2 is the precise notification situation higher than a notification frequency when the traveling situation of the vehicle 2 is not the precise notification situation regardless of whether or not measurement accuracy of a self-position in the navigation device 3 decreases. Alternatively, the notification frequency setting unit 42 may set a notification frequency when measurement accuracy of a self-position in the navigation device 3 decreases and the traveling situation of the vehicle 2 is also the precise notification situation higher than a notification frequency when the traveling situation of the vehicle 2 is not the precise notification situation.

In this way, the self-position sharing system can notify a user of an accurate position of the vehicle in the precise notification situation.

According to still another modification example, the processor 26 of the navigation device 3 may execute the processing of the notification frequency setting unit 42 according to the embodiment or the modification example described above. Then, the processor 26 may notify the vehicle 2 of a set notification frequency via the short-range communication equipment 24. In this case, the notification frequency setting unit 42 may use a self-position of the navigation device 3 acquired by the GPS receiver 22 instead of a self-position of the vehicle 2 used in the processing of setting a notification frequency in the embodiment or the modification example described above. Further, the navigation device 3 may receive map information representing an accuracy decreasing region from a map server that manages the map information via the wireless base station and the wireless communication equipment 23.

Further, a computer program that achieves a function of the processor 26 of the navigation device 3 according to the embodiment or the modified example described above may be provided in form of being recorded in a computer-readable portable recording medium, such as a semiconductor memory, a magnetic recording medium, or an optical recording medium. Similarly, a computer program that achieves a function of each unit of the processor 33 of the ECU 16 of the vehicle 2 according to the embodiment or the modification example described above may be provided in form of being recorded in a computer-readable portable recording medium, such as a semiconductor memory, a magnetic recording medium, or an optical recording medium.

As described above, those skilled in the art may make various changes in conformity to an embodiment within the scope of the present disclosure.

What is claimed is:
1. A self-position sharing system comprising:
a vehicle; and
a terminal installed in the vehicle and capable of communicating with the vehicle, wherein
the terminal includes a GPS receiver that measures a first self-position of the terminal, and
the vehicle includes:
    a memory configured to store information representing an accuracy decreasing region in which measurement accuracy of the first self-position based on the GPS receiver decreases; and
    a processor configured to:
        receive an image of a road;
        detect a structure on the road by inputting the image to a classifier that has been trained to detect structures on the road, the classifier comprising a convolutional neural network;
        project the detected structure onto a map, based on each of assumed positions of the vehicle;
        calculate a matching score between the detected structure and a corresponding structure on the map;
        estimate a second self-position of the vehicle with measurement accuracy higher than measurement accuracy of the terminal at a predetermined period based on an assumed position when the matching score is maximum, of the assumed positions;
        determine whether the second self-position of the vehicle is included in the accuracy decreasing region;
        determine that measurement accuracy of the first self-position of the terminal decreases when the second self-position of the vehicle is included in the accuracy decreasing region;

set a notification frequency of notifying the terminal of the second self-position of the vehicle to a first frequency when the measurement accuracy does not decrease;

set the notification frequency to a second frequency higher than the first frequency when the measurement accuracy decreases; and notify the terminal of the second self-position of the vehicle with the notification frequency being set among the first frequency and the second frequency.

2. The self-position sharing system according to claim 1, wherein the processor is further configured to determine whether or not a distance between a point at which a traveling state of the vehicle is changed and the vehicle is equal to or less than a predetermined distance, and set the notification frequency to a third frequency higher than the first frequency when the distance is equal to or less than the predetermined distance and the measurement accuracy decreases.

3. The self-position sharing system according to claim 1, wherein the terminal further includes:
a memory that stores map information,
a display device, and
a central processing unit that displays, on the display device, the second self-position of the vehicle notified from the vehicle together with a lane of a road represented in the map information in which the vehicle is traveling.

4. A vehicle in which a terminal capable of measuring a self-position is installed, comprising:
a memory configured to store information representing an accuracy decreasing region in which measurement accuracy of a first self-position of the terminal based on a GPS receiver decreases; and
a processor configured to:
receive an image of a road;
detect a structure on the road by inputting the image to a classifier that has been trained to detect structures on the road, the classifier comprising a convolutional neural network;
project the detected structure onto a map, based on each of assumed positions of the vehicle;
calculate a matching score between the detected structure and a corresponding structure on the map;
estimate a second self-position of the vehicle with measurement accuracy higher than measurement accuracy of the terminal at a predetermined period based on an assumed position when the matching score is maximum, of the assumed positions;
determine whether the second self-position of the vehicle is included in the accuracy decreasing region;
determine that measurement accuracy of the first self-position of the terminal decreases when the second self-position of the vehicle is included in the accuracy decreasing region;
set a notification frequency of notifying the terminal of the second self-position of the vehicle to a first frequency when the measurement accuracy does not decrease;
set the notification frequency to a second frequency higher than the first frequency when the measurement accuracy decreases; and
notify the terminal of the second self-position of the vehicle with the notification frequency being set among the first frequency and the second frequency.

* * * * *